(12) United States Patent
Becker et al.

(10) Patent No.: US 9,869,755 B2
(45) Date of Patent: Jan. 16, 2018

(54) LASER SCANNER AND METHOD OF REGISTERING A SCENE

(71) Applicant: FARO Technologies, Inc., Lake Mary, FL (US)

(72) Inventors: Reinhard Becker, Ludwigsburg (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 556 days.

(21) Appl. No.: 14/617,477

(22) Filed: Feb. 9, 2015

(65) Prior Publication Data
US 2015/0226840 A1 Aug. 13, 2015

(30) Foreign Application Priority Data
Feb. 9, 2014 (DE) .................. 10 2014 101 587

(51) Int. Cl.
| G01S 7/481 | (2006.01) |
| G01B 11/00 | (2006.01) |
| G01S 17/02 | (2006.01) |
| G01S 17/08 | (2006.01) |
| G01C 15/00 | (2006.01) |

(Continued)

(52) U.S. Cl.
CPC .......... G01S 7/4817 (2013.01); G01B 11/005 (2013.01); G01C 15/002 (2013.01); G01S 7/4808 (2013.01); G01S 17/023 (2013.01); G01S 17/08 (2013.01); G01S 17/42 (2013.01); G01S 17/89 (2013.01); G06T 7/30 (2017.01); G06T 2207/10028 (2013.01)

(58) Field of Classification Search
CPC ........ G01S 17/42; G01S 17/023; G01S 17/08; G01S 17/89; G01S 7/4808; G01S 7/4817; G01B 11/005; G01C 15/002; G06T 7/30; G06T 2207/10028

USPC ....................................... 356/5.01
See application file for complete search history.

(56) References Cited

U.S. PATENT DOCUMENTS

2012/0257792 A1* 10/2012 Simon .................. G01C 11/06
382/103

FOREIGN PATENT DOCUMENTS

| DE | 102009015922 A1 | 10/2010 |
| EP | 1662228 A1 | 5/2006 |
| WO | 2010108644 A1 | 9/2010 |

OTHER PUBLICATIONS

DE Office Action for Application No. 102014101587.8 dated Oct. 30, 2014, 6 pages.

(Continued)

*Primary Examiner* — Mark Hellner
(74) *Attorney, Agent, or Firm* — Cantor Colburn LLP

(57) ABSTRACT

A laser scanner and method of operation to determine the consistency of a registration is provided. The method includes generating with the laser scanner at least a first scan of the scene with first measuring points. The laser scanner generates at least one second scan of the scene with second measuring points. At least one measured distance is determined from at least one of the second measuring points to the center of the second scan. The second scan is provisionally registered subjected to a consistency check. The consistency check is performed. At least one virtual distance is determined from at least one of the first measuring points to the center of the second scan. The consistency check is based at least in part on comparing the at least one virtual distance with the at least one measured distance.

14 Claims, 5 Drawing Sheets

(51) Int. Cl.
  *G01S 17/89* (2006.01)
  *G01S 17/42* (2006.01)
  *G01S 7/48* (2006.01)
  *G06T 7/30* (2017.01)

(56) References Cited

OTHER PUBLICATIONS

DEVRIM AKCA: "Full Automatic Registration of Laser Scanner Point Clouds", Optical 3D Measurement Techniques, ETH, Swiss Federal Institute of Technology Zurich, Institute of Geodesy and Photogrammetry, CH, vol. VI, Jan. 1, 2003 (Jan. 1, 2003), pp. 1-8, XP002590305.
Han, Jen-Yu et al., "Lidar Point Cloud Registrationby Image Detection Technique" IEEE Geoscience and Remote Sensing Letters, IEEE Service Center, New York, NY, US, vol. 10, No. 4, Jul. 1, 2013 (Jul. 7, 2013), pp. 746-750, XP011516169, ISSN: 1545-598X.
International Search Report and Written Opinion for International Application No. PCT/US2015/012811 dated May 4, 2015; 14 pgs. FAO1053PCT.
Silva et al, "Multiview Range Image Registration Using the Surface Interpenetration Measure", Image and Vision Computing, Elsevier, Guildford, GB, vol. 25, No. 1, Nov. 2, 2006 (Nov. 2, 2006), pp. 114-125, XP005846923.

* cited by examiner

LASER SCANNER AND METHOD OF REGISTERING A SCENE

CROSS REFERENCE TO RELATED APPLICATIONS

The present application claims the benefit of German Application DE 10 2014 101 587.8 filed on Feb. 9, 2014, the contents of which are incorporated herein by reference in their entirety.

BACKGROUND OF THE INVENTION

The subject matter disclosed herein relates to a laser scanner, and in particular to a method of operating the laser scanner to register a scene with a consistency check.

A laser scanner is a device that can optically scan and measure a surrounding environment or scene. To scan a larger scene, it may be necessary to make several scans from various positions, i.e. with different centers. Targets, which have been previously installed, and which are present in overlapping areas of two adjacent scans, are localized by a user and identified in the two adjacent scans.

Some laser scanners, such as that described in U.S. Patent Application 2012/0069352 for example, describes a method of registering scenes, in which a scene is registered with multiple scans. For this purpose, the laser scanner is taken to a new location after a scan in order to generate a further scan. The generated scans with their measuring points are registered in a common coordinate system, wherein the entity of measuring points forms a three-dimensional point cloud.

Accordingly, while existing laser scanners are suitable for their intended purposes a need for improvement remains, particularly in providing a method for registering scenes which provides for a consistency check between the scans.

BRIEF DESCRIPTION OF THE INVENTION

According to one aspect of the invention, a method is provided that improves automatic registering in terms of a consistency check. This consistency check proceeds from a registered first scan and any preceding scans, which together define the three-dimensional point cloud which serves as a reference. A further, second scan, which is registered provisionally relative to the reference, is included. A virtual scan of the registered three-dimensional point cloud (i.e. of the first measuring points) which takes place from the center of the second scan is compared with actual measured distances to the points. The comparison preferably takes place by means of the distances of measuring points within certain solid angle elements. If appropriate, interpolations are to be used. An inconsistency occurs if a formation of the first measuring points has not been recognized in the second scan.

According to another aspect of the invention, a method for optically scanning and measuring a scene by means of a laser scanner is provided. The method comprising the steps of: generating with the laser scanner at least a first scan of the scene with first measuring points, wherein the at least first scan is registered in a common coordinate system of the scene; generating with the laser scanner at least one second scan of the scene with second measuring points, wherein the second scan includes a center and the second measuring points are registered in the common coordinate system; determining at least one measured distance from at least one of the second measuring points to the center of the second scan, the at least one measured distance being a vector; provisionally registering of the second scan subjected to a consistency check; performing the consistency check, which includes at least part of the first measuring points, at least part of the second measuring points and the center of the second scan; and determining at least one virtual distance from at least one of the first measuring points to the center of the second scan, the at least one virtual distance being a vector; wherein the consistency check is based at least in part on comparing the at least one virtual distance with the at least one measured distance.

According to yet another aspect of the invention, a laser scanner device is provided. The device includes a base and a measuring head which is rotatable with regard to the base. A light emitter is provided that emits an emission light beam. A light receiver is provided that is configured to receive a reception light beam reflected by an object in an environment. A control and evaluation unit is provided which determines for a plurality of measuring points of each scan at least the distance from a center of the laser scanner to the object and registers the generated scan in a common coordinate system of the scene. The control and evaluation unit is further configured to generate a first scan with a first plurality of measuring points and a second scan with a second plurality of measuring points, the first plurality of measuring points and second plurality of measuring points being registered in the common coordinate system. The control and evaluation unit is further configured to determine at least one measured distance from at least one of the second measuring points to a center of the second scan and to determine at least one virtual distance from at least one of the first measuring points to the center of the second scan. The control and evaluation unit is still further configured to perform a consistency check based at least in part on comparing the at least one virtual distance with the at least one measured distance, wherein the at least one virtual distance and the at least one measured distance are vectors.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
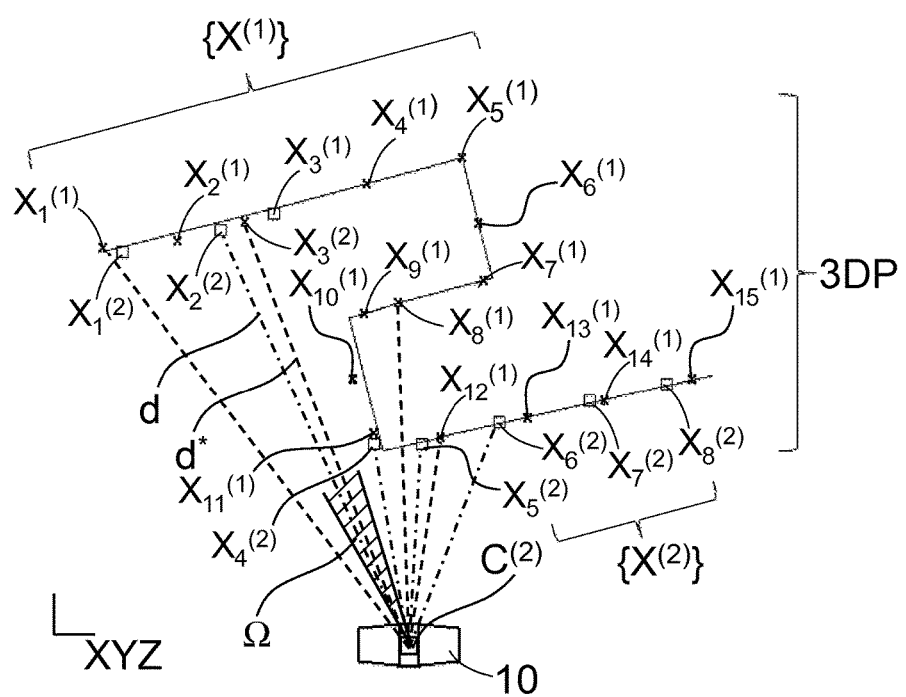
FIG. 1 is a schematic top view illustrating two scans with a consistent provisional registering of the second scan in accordance with an embodiment of the invention.

The detailed description explains embodiments of the invention, together with advantages and features, by way of example with reference to the drawings.

DETAILED DESCRIPTION OF THE INVENTION

The present invention relates to a 3D coordinate measurement device for optically scanning and measuring an environment. The 3D coordinate measurement device steers a beam of light to an object O, which may be either a (cooperative) target such as a retroreflector or a non-cooperative target such as a diffusely scattering surface of the object O. A distance meter in the device measures a distance to the object O, and angular encoders measure the angles of rotation of two axles in the device. The measured distance and the two angles enable a processor in the device to determine the 3D coordinates of the object O. The present embodiment discusses the case of a laser scanner 10, but the extension to a laser tracker or total station will be clear to one of ordinary skill in the art.

Laser scanners are typically used for scanning closed or open spaces such as interior areas of buildings, industrial installations and tunnels. Laser scanners are used for many purposes, including building information modeling (BIM), industrial analysis, accident reconstruction applications, archaeological studies, and forensics investigations. A laser scanner can be used to optically scan and measure objects in a volume around the laser scanner through the acquisition of data points representing objects within the volume. Such data points are obtained by transmitting a beam of light onto the objects and collecting the reflected or scattered light to determine the distance, two-angles (i.e., an azimuth angle and a zenith angle), and optionally a gray-scale value. This raw scan data is collected, stored and sent to a processor or processors to generate a three-dimensional image representing the scanned area or object. In order to generate the image, at least three values are collected for each data point. These three values may include the distance and two angles, or may be transformed values, such as x, y, z coordinates.

In the drawings, a laser scanner 10 is shown for optically scanning and measuring the environment surrounding the laser scanner 10. The laser scanner 10 comprises a measuring head 12 and a base 14. The measuring head 12 is mounted on the base 14 such that the measuring head 12 can rotate with respect to the base 14 about a first axis 12a, driven by a first rotary drive. The rotation about the first axis 12a axis may be about the center of the base 24. The measuring head 12 comprises a mirror 16, which can rotate about a second axis 16a, driven by a second rotary drive. Referring to a normal upright position of the laser scanner 10, the first axis 12a may be called vertical axis or azimuth axis, the second axis 16a may be called horizontal axis or zenith axis. The laser scanner 10 may comprise a gimbal point or center $C_{10}$ that is the intersection point of the first axis 12a and the second axis 16a.

The measuring head 12 is further provided with an electromagnetic radiation emitter, such as light emitter 17, for example, that emits an emission light beam 18. In the preferred embodiment, the emission light beam 18 is a coherent light such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emission light beam 18 may be amplitude or intensity modulated, for example, with a sinusoidal waveform or with a rectangular waveform. In another embodiment, the emission light beam 18 may be otherwise modulated, for example, with a chirp signal, or coherent receiver methods may be used. The emission light beam 18 is emitted by the light emitter 17 onto the mirror 16, where it is deflected to the environment of the laser scanner 10.

A reflected light beam, hereinafter called reception light beam 20, is reflected from the environment by an object O. The reflected or scattered light is intercepted by the rotary mirror 16 and directed onto a light receiver 21 with a reception optics. The directions of the emission light beam 18 and the reception light beam 20 result from the angular positions of the measuring head 12 and the mirror 16 about the axis 12a and 16a, respectively. These angular positions in turn depend on the corresponding rotary drives. The angle of rotation about the first axis 12a is measured by a first angular encoder. The angle of rotation about the second axis 16a is measured by a second angular encoder.

A control and evaluation unit 22 comprises a distance meter and a processor. The control and evaluation unit 22 has a data connection with the light emitter 17 and the light receiver 21 inside the measuring head 12. In other embodiments, the control and evaluation unit 22 may be arranged outside the measuring head 12, for example as a computer connected to the base 14. The computer may also be arranged distal to the base 14 and connected via LAN or WAN network (wired or wireless). The control and evaluation unit 22 is designed to determine, for a multitude of measuring points X, a corresponding number of distances d between the laser scanner 10 and measuring points X on object O. The distance to a particular measuring point X is determined based at least in part on the speed of light in air through which electromagnetic radiation propagates from the device to the measuring point X. In one embodiment, the phase-shift in the modulated light beam 18, 20 is determined and evaluated to obtain a measured distance d.

The speed of light in air depends on the properties of the air such as the air temperature, barometric pressure, relative humidity, and concentration of carbon dioxide. Such air properties influence the index of refraction "n" of the air. The speed of light in air is equal to the speed of light in vacuum divided by the index of refraction. A laser scanner of the type discussed herein is based on the time-of-flight of the light in the air (the round-trip time for the light to travel from the device to the object and back to the device). A method of measuring distance based on the time-of-flight of light (or the time-of-flight of any type of electromagnetic radiation) depends on the speed of light in air and is therefore not the same as methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based one known length and two known angles of a triangle. The method of triangulation, therefore, does not directly depend on the speed of light in air.

The measuring head 12 may include a display device 24 integrated into the laser scanner 10. The display device 24 includes a user interface, which may be a graphical touch screen, as shown in the drawing. For example, the display device 24 may have a user interface that allows the operator to provide measurement instructions to the laser scanner 10, in particular to set the parameters or initiate the operation of the laser scanner 10, and the display device 24 may also display measurement results.

In an embodiment, the scanning of the environment of the laser scanner 10 takes place by quickly rotating the mirror 16 about the second axis 16a while slowly rotating the measuring head 12 about the first axis 12a, thereby projecting the emission light beam in a spiral pattern. In an exemplary embodiment, the mirror 16 rotates at a maximum speed of 5820 revolutions per minute. A scan is defined to be the entity of measuring points X of such a measuring. For such a scan, the center $C_{10}$ defines the origin of the local stationary reference system. The base 14 rests in this local stationary reference system.

In addition to measuring a distance d from the center $C_{10}$ to a measuring point X on the object O, the laser scanner 10 may also collect gray-scale values related to the received optical power. The gray-scale value may be determined, for example, by integration of the bandpass-filtered and amplified signal in the light receiver 21 over a measuring period attributed to the measuring point X. In other embodiments, the color images can be generated by means of a color camera 25. By means of these color images, colors (R, G, B) can be assigned to the measuring points X as additional values.

In order to scan a scene from different directions or a large space, multiple scans may be captured from different locations (corresponding to an amount of different centers and then registered in a common coordinate system XYZ (FIG. 1 and FIG. 2) of the scene. To accomplish this, the laser scanner 10 is moved and its location changed for each scan. Thus each time the laser scanner 10 is moved, the position of the center $C_{10}$ of the laser scanner 10 within the common coordinate system XYZ is also changed. To facilitate these position changes, the laser scanner 10 preferably is mounted on a trolley, as described in commonly owned DE 10 2010 033 561 B3 (U.S. Patent Publication 2013/0070250) which is incorporated by reference herein. In this way, the laser scanner 10 may be moved from one location with a first center position (relative to the common coordinate system XYZ) to another location with a second center position (relative to the common coordinate system XYZ) with the relative positions of the centers being recorded. In another embodiment, the laser scanner 10 is mounted on a tripod or carriage. Then, when the location of the laser scanner 10 is changed, the relative position of the centers is generally not known.

To register the scans, preferably targets, which are localized and identified in overlapping areas of the scans, are used. Both, "natural" targets, i.e. certain features or formations of the object O, and "artificial" targets, i.e. targets which have been applied especially for the scanning process to the object O or to the environment, such as checker-board patterns for example, are appropriate as targets. Preferably, the geometry in which a target is embedded and which is defined by means of the adjacent targets, is determined for each target, as described in commonly owned DE 10 2009 015 922 A1 (U.S. Patent Publication 2012/0069352) which is incorporated by reference herein. The embedded geometries can then be compared with each other in order to automatically find the desired level of assignment for the scan. When all scans are registered in the common coordinate system XYZ, the entity of all measuring points X of all scans forms a three-dimensional point cloud 3DP.

According to an embodiment of the invention, registering of every further scan at first takes place only provisionally and is subjected to a method for consistency check. The three-dimensional point cloud 3DP which has already been registered in the common coordinate system XYZ serves as reference for the consistency check. In the following this reference is denoted first scan $\{X^{(1)}\}$, and the measuring points contained therein are denoted first measuring points $X_i^{(1)}$ (wherein i=1, ... n), although this first scan $\{X^{(1)}\}$ can comprise not only the scan which is adjacent with respect to space and/or time, but also preceding scans. The further scan, the provisional registering of which is to be checked, is correspondingly denoted second scan $\{X^{(2)}\}$, and the measuring points contained therein measuring points $X_i^{(2)}$ (wherein i=1, ... ). In one embodiment, the center $C^{(2)}$ of the second scan $\{X^{(2)}\}$ corresponds to the Center $C_{10}$ of the laser scanner 10 (e.g. the gimbal point) during the generation of the second scan $\{X^{(2)}\}$. FIG. 1 shows a consistent provisional registering, FIG. 2 an inconsistent provisional registering, and FIG. 3 a schematic flow chart is shown for the method of performing the consistency check, wherein the partial steps of the method steps can be carried out sequentially (as represented by loops) or in parallel.

A first group 101 of steps comprises a starting step 101a, a processing step 101b, and a decision step 101c whether the processing has to be continued (loop counter smaller than end of loop). In said first group 101, in particular in processing step 101b, referring to the center $C^{(2)}$ of the second scan $\{X^{(2)}\}$ which is positioned in the coordinate system of the first scan $\{X^{(1)}\}$ (i.e. in the joint coordinate system XYZ), the (virtual) distances d* of the first measuring points $Xi^{(1)}$ to this center $C^{(2)}$ are determined in the coordinate system of the first scan $\{X^{(1)}\}$, for example by means of an appropriate filter. This determination is shown symbolically in FIG. 3 by $d^*=X^{(1)}-C^{(2)}$ in processing step 101b. In one embodiment it is sufficient to include only part of the first measuring points $Xi^{(1)}$, namely the closest-by first measuring points $Xi^{(1)}$, and to take them into account for determining the virtual distances d*, for example by means of a threshold value or by means of interval limits in the common coordinate system XYZ. In other embodiments, more distant first measuring points $Xi^{(1)}$ can be considered. This first group 101 of steps corresponds to a virtual scan, i.e. the virtual distances d* are vectors and contain not only a scalar value, but also angle values of the virtual angle positions of a measuring head and a mirror, i.e. two angle values for each virtual distance d*. A solid angle element n may be associated to each virtual distances d*. The solid angle element n is defined by certain ranges of the two angle values.

Figure 3:
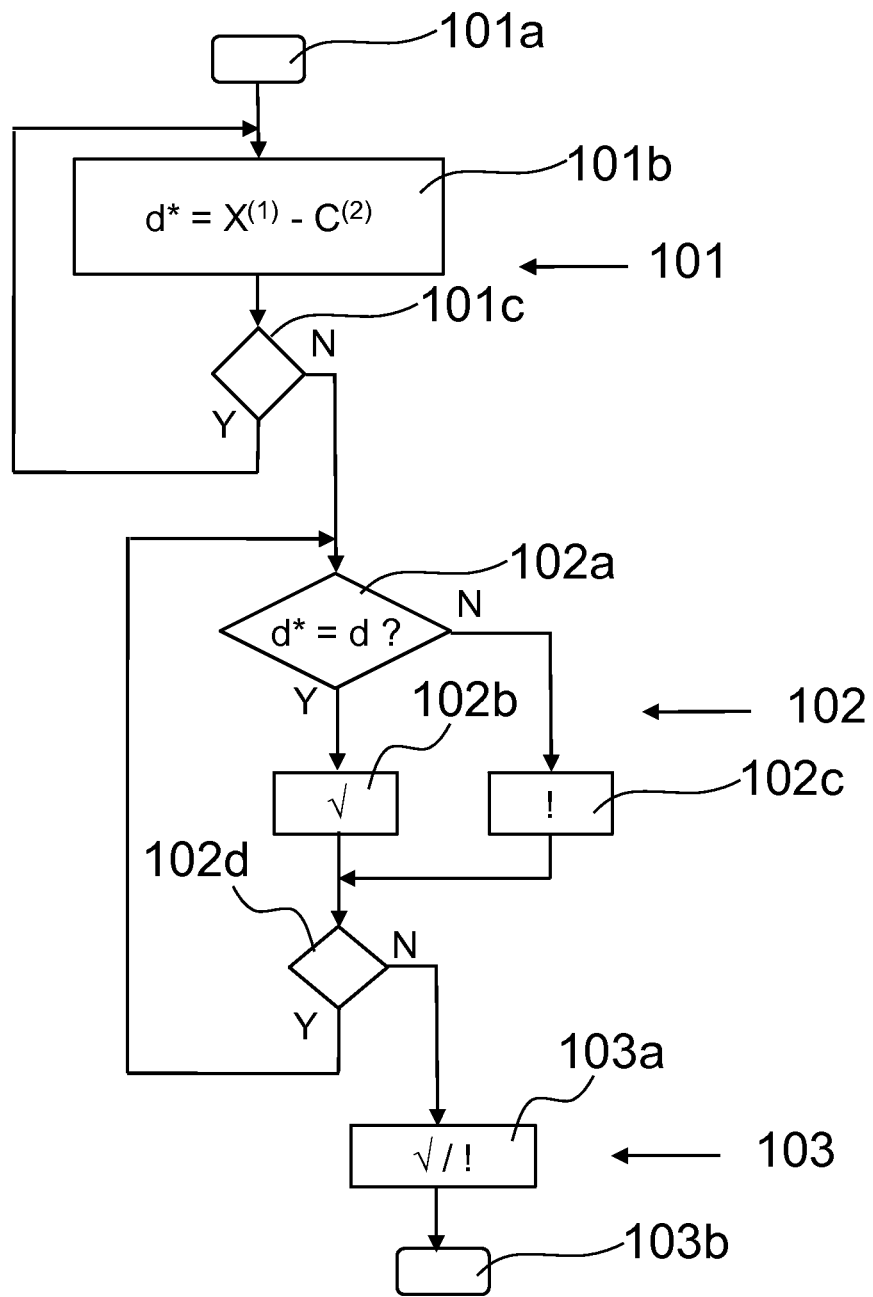
FIG. 3 is a flow chart illustrating a method of performing a consistency check in accordance with an embodiment of the invention.
Figure 4:
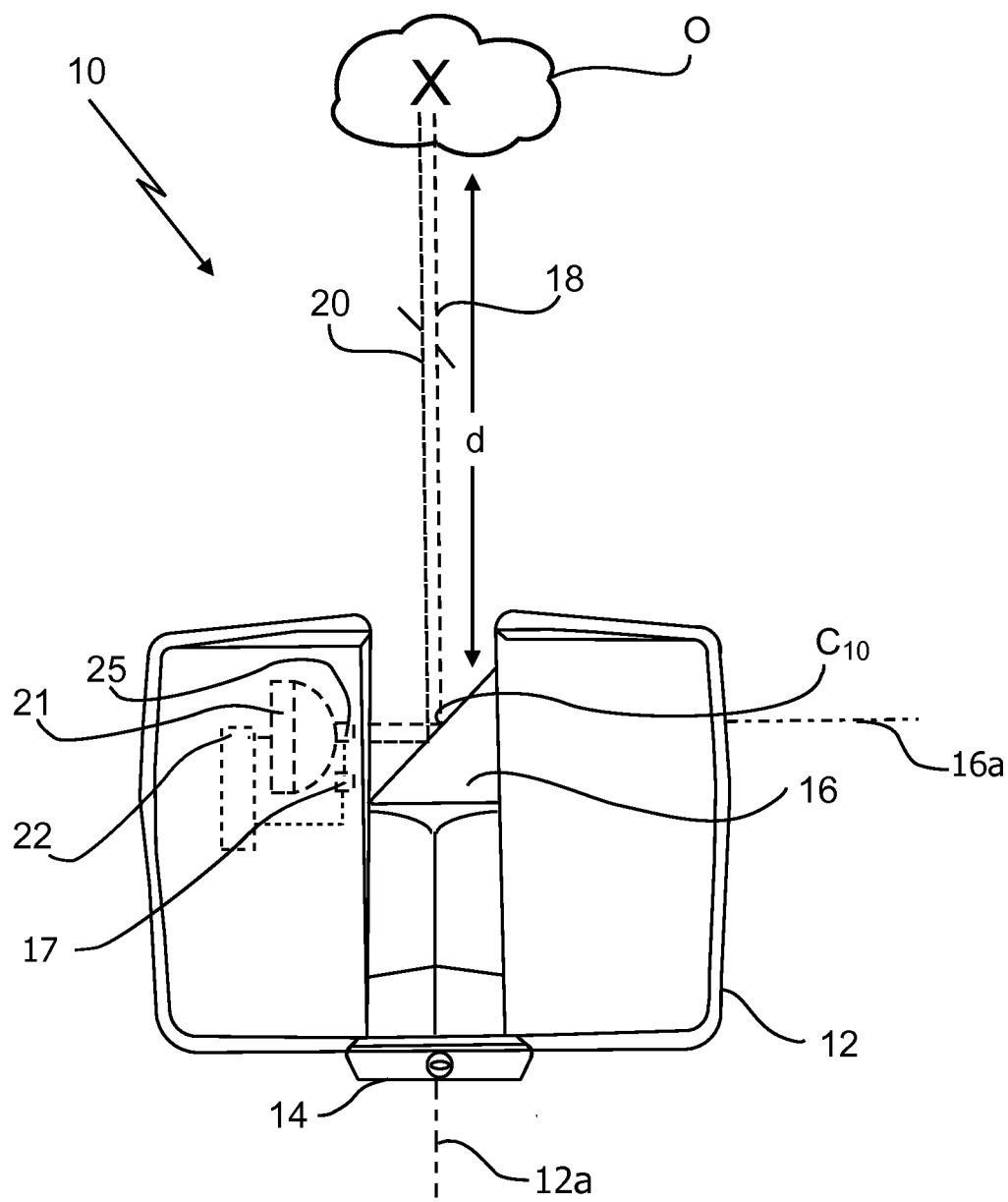
FIG. 4 is a side view, partially in section, illustrating a laser scanner in accordance with an embodiment of the invention.
Figure 5:
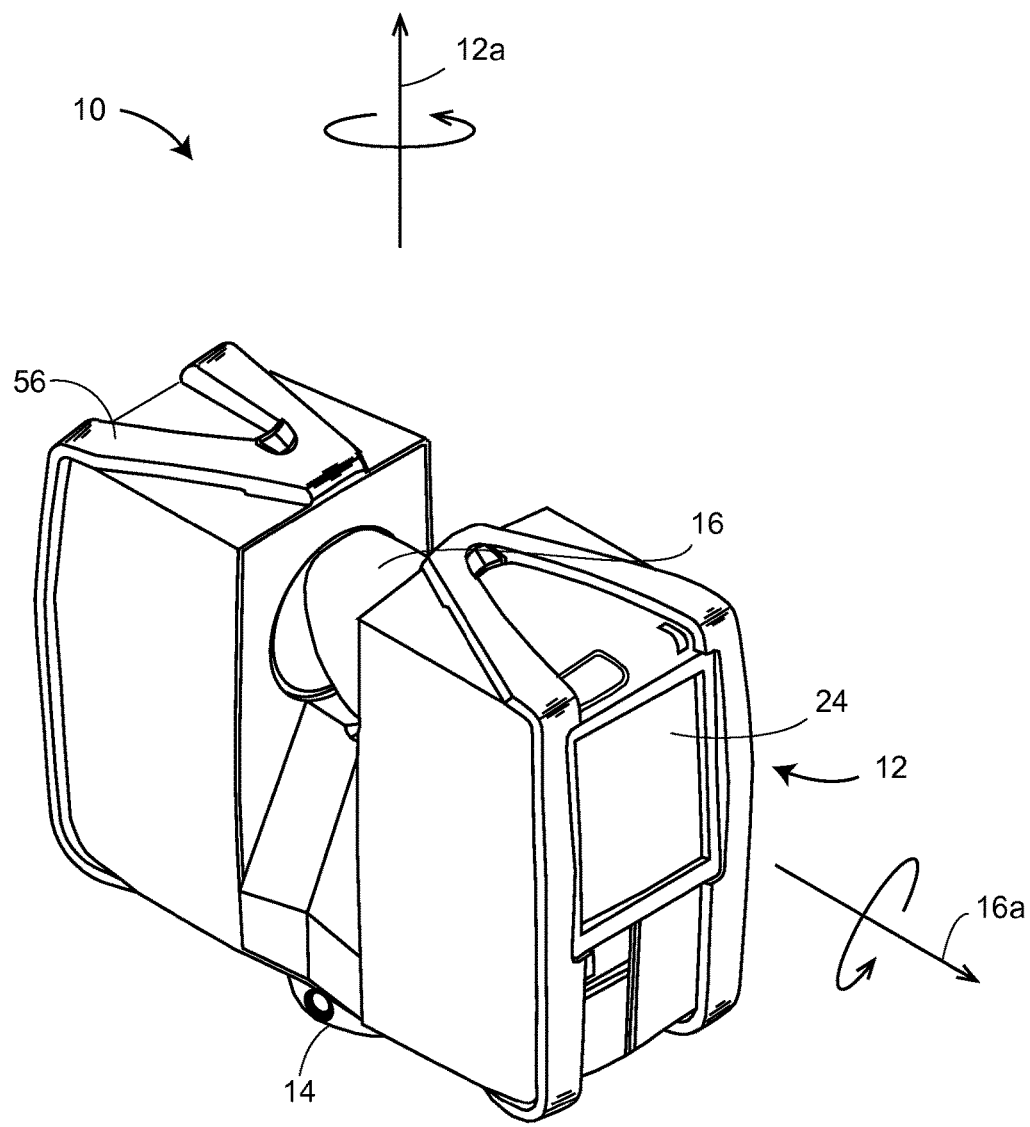
FIG. 5 is a perspective view illustrating the laser scanner of FIG. 4.

A second group 102 of steps comprises a decision step 102a, two alternative processing steps 102b and 102c, and a decision step 102d whether the processing has to be continued (loop counter smaller than end of loop). In the second group 102 of steps, in particular in the decision step 102a, the virtual distances d* are compared with the measured distances d of the second measuring points Xi(2), which are vectors as well. This comparison may be performed by means of an appropriate filter for example. The comparison is performed within certain angular areas, i.e. a measured distance d may be compared with a virtual distance d* if the second measuring point $X_i^{(2)}$ associated to the measured distance d is inside the angular area $\Omega$ associated to the virtual distance d*. Since the angle values of the virtual distances d* and of the measured distances d of the second measuring points $X_i^{(2)}$ will normally match only accidentally, the size of the angular area $\Omega$ needs to be large enough to encompass the points or otherwise auxiliary constructions may be used. For example, and auxiliary construction may be an auxiliary plane defined by the three nearest second measuring points $X_i^{(2)}$ or other interpolations. The term "nearest" in this context refers to the angle values, such as the three second measuring points $X_i^{(2)}$ will be inside the angular area $\Omega$. If appropriate, only part of the second measuring points $X_i^{(2)}$ is included in the comparison. The notion "measured distance" shall also include distances determined by interpolation. With this comparison, each time a consistency check is performed whether the virtual distance d* is as large as or larger than the measured distance d, based on the second measuring points $Xi^{(2)}$, will have to be taken into account. In FIG. 3 this comparison is shown symbolically by d*=d? in the decision step 102a.

If the answer to decision step 102a is "yes" (Y), there is consistency in this area of provisional registering. In other words within area of the first measuring points $X_i^{(1)}$ and the second measuring points $X_i^{(2)}$ which have been compared relative to the distances d* and d. In FIG. 3 the determination of consistency in step 102b is shown symbolically by a hook √. A larger virtual distance d* can arise, for example, in the case of an undercut, which cannot be recognized in the second scan $\{X^{(2)}\}$. In FIG. 1, some first measuring points $X_i^{(1)}$ of that kind are plotted, which are not visible from the center C(2) because they are located in a recess behind a wall "w."

Figure 2:
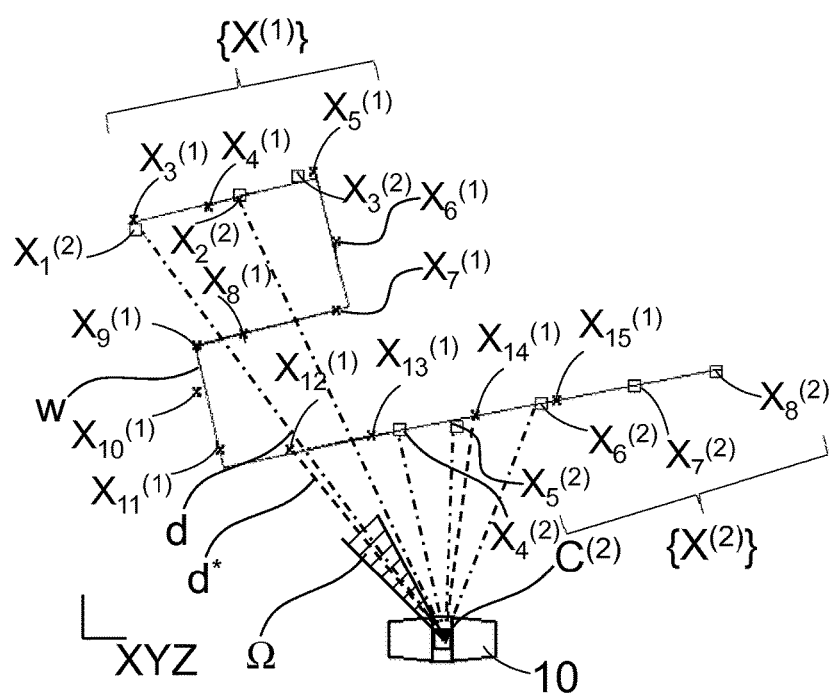
FIG. 2 is a schematic top view illustrating two scans with an inconsistent provisional registering of the second scan in accordance with an embodiment of the invention.

If the decision block 102a returns a "no" (N), i.e. the virtual distance d* is smaller than the measured distance by a predetermined threshold amount, there is determined to be an inconsistency. In FIG. 3 the determination of inconsistency in step 102c is shown symbolically by an exclamation mark !. For the second scan $\{X^{(2)}\}$, the emission light beam 18 would have had to hit the obstacle in the first scan $\{X^{(1)}\}$, which corresponds to the smaller virtual distance d*. In FIG. 2, this obstacle is the protruding wall "w" which, due to a supposed, erroneous offset, is visible in the provisional registering at another place in the second scan $\{X^{(2)}\}$ only.

The third group 103 of steps comprises a processing step 103a and an ending step 103b. In the third group 103, in particular in step 103a, the provisional registering passes the consistency check and is confirmed (√) when, in the second group 102 of steps, only consistencies have been found. In one embodiment, the provisional registration is confirmed if the number of inconsistencies is within predefined criteria, for example a threshold value. If the consistency check is not confirmed or passed, then the provisional registration is rejected (!), so that the second scan $\{X^{(2)}\}$ must be registered again. In one embodiment, when the inconsistencies can be recognized as systematically, the provisional registering can be corrected. In the exemplary embodiment according to FIG. 2, this correction would result in an offset of the second scan $\{X^{(2)}\}$.

In an embodiment, the virtual distances d* of the first measuring points $X_i^{(1)}$ relative to the center $C^{(2)}$ of the second scan $\{X^{(2)}\}$ are determined, and compared with the measured distances d of the second measuring points $X_i^{(2)}$ relative to the center $C^{(2)}$ of the second scan $\{X^{(2)}\}$. However, it may also be the reverse, in other words the virtual distances d* of the second measuring points $X_i^{(2)}$ relative to the center $C^{(1)}$ of the first scan $\{X^{(1)}\}$ are determined, and compared with the measured distances d of the first measuring points $X_i^{(1)}$ relative to the center $C^{(1)}$ of the first scan $\{X^{(1)}\}$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. Method for optically scanning and measuring a scene by means of a laser scanner comprising:
   generating with the laser scanner at least a first scan of the scene with first measuring points, wherein the at least first scan is registered in a common coordinate system of the scene;
   generating with the laser scanner at least one second scan of the scene with second measuring points, wherein the second scan includes a center and the second measuring points are registered in the common coordinate system;
   determining at least one measured distance from at least one of the second measuring points to the center of the second scan, the at least one measured distance being a vector;
   provisionally registering of the second scan subjected to a consistency check;
   performing the consistency check, which includes at least part of the first measuring points, at least part of the second measuring points and the center of the second scan;
   determining at least one virtual distance from at least one of the first measuring points to the center of the second scan, the at least one virtual distance being a vector; and
   wherein the consistency check is based at least in part on comparing the at least one virtual distance with the at least one measured distance.

2. Method according to claim 1, wherein the step of comparing the at least one virtual distance and the at least one measured distance with a respective angle values, wherein the at least one measured distance is interpolated from a plurality of second measuring points.

3. Method according to claim 2 further comprising determining there is consistency within the area of the first and second measuring points when the at least one virtual distance is equal to or larger than the at least one measured distance.

4. Method according to claim 3 further comprising determining there is an is inconsistency within the area of the first and second measuring points when the at least one virtual distance is smaller than the at least one measured distance.

5. Method according to claim 4 wherein the step of provisional registering passes the consistency check and is confirmed when only consistencies result, and rejects the provisional registering when there is any inconsistency result.

6. Method according to claim 4 wherein the step of provisional registering passes the consistency check and is confirmed when the number of inconsistencies is less than a predetermined threshold.

7. Method according to claim 5 wherein the provisional registering is performed automatically using at least one target arranged in an area of overlap of the first scan and of the second scan.

8. Method according to claim 7 further comprising moving a location of the laser scanner from a first position to a second position between the first scan and the second scan.

9. Laser scanner comprising:
   a base;
   a measuring head which is rotatable with regard to the base;
   a light emitter which emits an emission light beam;

a light receiver which is configured to receive a reception light beam reflected by an object in an environment; and a control and evaluation unit which determines for a plurality of measuring points of each scan at least the distance from a center of the laser scanner to the object and registers the generated scan in a common coordinate system of the scene;

wherein the control and evaluation unit is further configured to generate a first scan with a first plurality of measuring points and a second scan with a second plurality of measuring points, the first plurality of measuring points and second plurality of measuring points being registered in the common coordinate system;

wherein the control and evaluation unit is further configured to determine at least one measured distance from at least one of the second measuring points to a center of the second scan and to determine at least one virtual distance from at least one of the first measuring points to the center of the second scan;

wherein the control and evaluation unit is further configured to perform a consistency check based at least in part on comparing the at least one virtual distance with the at least one measured distance, wherein the at least one virtual distance and the at least one measured distance are vectors.

10. The laser scanner of claim 9 wherein control and evaluation unit is configured to determine the at least one measured distance by interpolating from the second plurality of measuring points.

11. The laser scanner of claim 10 wherein the control and evaluation unit is configured to determine an inconsistency when the at least one virtual distance is smaller than the at least one measured distance.

12. The laser scanner of claim 11 wherein the control and evaluation unit is configured to pass a provisional registration when the consistency check determines only consistencies.

13. The laser scanner of claim 11 wherein the control and evaluation unit is configured to pass a provisional registration when the consistency check determines a number of inconsistencies is smaller than a predefined threshold.

14. The laser scanner of claim 12 further comprising
at least one target arranged in a location captured in the first scan and the second scan;
wherein the control and evaluation unit is configured to automatically register the first scan and second scan using the at least one target.

* * * * *